(12) United States Patent
Kotaka et al.

(10) Patent No.: US 8,358,860 B2
(45) Date of Patent: Jan. 22, 2013

(54) MOTION VECTOR DETECTING DEVICE, MOTION VECTOR DETECTING METHOD, IMAGE ENCODING DEVICE, AND PROGRAM

(75) Inventors: Naohiko Kotaka, Tokyo (JP); Munehiro Nakazato, Sunnyvale, CA (US)

(73) Assignee: Sony Corporation (JP)

( * ) Notice: Subject to any disclaimer, the term of this patent is extended or adjusted under 35 U.S.C. 154(b) by 748 days.

(21) Appl. No.: 12/460,074

(22) Filed: Jul. 13, 2009

(65) Prior Publication Data

US 2010/0014765 A1  Jan. 21, 2010

(30) Foreign Application Priority Data

Jul. 15, 2008 (JP) ................ P2008-184040

(51) Int. Cl.
  *G06K 9/36* (2006.01)
  *G06K 9/46* (2006.01)
  *H04N 11/02* (2006.01)
(52) U.S. Cl. ............... 382/236; 375/240.16; 375/240.17
(58) Field of Classification Search .................. None
  See application file for complete search history.

(56) References Cited

U.S. PATENT DOCUMENTS

| | | | | |
|---|---|---|---|---|
| 2005/0243921 A1* | 11/2005 | Au et al. | .................. | 375/240.12 |
| 2007/0071104 A1* | 3/2007 | Kondo | .................. | 375/240.21 |
| 2007/0154103 A1* | 7/2007 | Au et al. | .................. | 382/236 |
| 2007/0165716 A1* | 7/2007 | Kitamura et al. | ........ | 375/240.12 |
| 2007/0217515 A1* | 9/2007 | Wang et al. | .............. | 375/240.17 |
| 2008/0069203 A1* | 3/2008 | Karczewicz et al. | .... | 375/240.01 |
| 2009/0135901 A1* | 5/2009 | Au et al. | .................. | 375/240.02 |
| 2010/0014001 A1* | 1/2010 | Nakazato | ................. | 348/699 |
| 2010/0014588 A1* | 1/2010 | Nakazato et al. | ........ | 375/240.16 |

FOREIGN PATENT DOCUMENTS

| | | |
|---|---|---|
| EP | 0294962 A2 | 12/1988 |
| EP | 0366165 A2 | 5/1990 |
| JP | 05236452 A | 9/1993 |
| JP | 09149416 A | 6/1997 |
| JP | 2003-230149 A | 8/2003 |
| JP | 2004-241957 A | 8/2004 |
| JP | 2005064655 A | 3/2005 |
| JP | 2005136941 A | 5/2005 |
| JP | 2008042424 A | 2/2008 |

OTHER PUBLICATIONS

C.Y. Kao, et al. "High performance fractional motion estimation and mode decision for H.264/AVC", IEEE, 2006.*
JW Suh, "Fast sub-pixel motion estimation techniques having lower computational complexity", IEEE, 2004.*
Office Action from Japanese Application No. 2008-184040, dated Apr. 22, 2010.
Partial European Search Report, EP 09165575, dated Dec. 4, 2009.

(Continued)

*Primary Examiner* — Li Liu
(74) *Attorney, Agent, or Firm* — Lerner, David, Littenberg, Krumholz & Mentlik, LLP

(57) ABSTRACT

A motion vector detecting device includes: a motion predicting and compensating means for calculating cost values of a plurality of motion vectors, which is candidates of an optimal motion vector, with a first pixel precision every prediction mode and calculating the optimal motion vector with a second pixel precision and a cost value of the optimal motion vector with the second pixel precision on the basis of a gradient of the cost values.

18 Claims, 9 Drawing Sheets

OTHER PUBLICATIONS

Peng Yin et al: "Fast node decision and motion estimation for JVT/H.264" Proceedings 2003 International Conference on Image Processing. ICIP-2003. Barcelona, Spain, Sep. 14-17, 2003; [International Conference on Image Processing], New York, NY : IEEE, US, vol. 3, Sep. 14, 2003, pp. 853-856, XP010669968 ISBN: 978-0-7803-7750-9.

Chen: "Fast Integer and Fractional Pel Motion Est" Joint Video Team (JVT) of ISO/IEC MPEG & ITU-T VCEG (ISO/IEC JTC1/SC29/WG11 and ITU-T SG16 Q6), XX, XX, No. JVT-F017r1, Dec. 13, 2002, XP030005588 section 3.

* cited by examiner

MOTION VECTOR DETECTING DEVICE, MOTION VECTOR DETECTING METHOD, IMAGE ENCODING DEVICE, AND PROGRAM

CROSS-REFERENCE TO RELATED APPLICATION

The present application claims priority from Japanese Patent Application JP 2008-184040 filed in the Japanese Patent Office on Jul. 15, 2008, the entire content of which is incorporated herein by reference.

BACKGROUND OF THE INVENTION

1. Field of the Invention

The present invention relates to a motion vector detecting device, a motion vector detecting method, an image encoding device, and a program capable of reducing an amount of operations accompanied with a detection of a motion vector.

2. Description of Related Art

Techniques of efficiently transmitting and storing image data effectively using the redundancy of the image data in transmitting and storing moving images associated with broadcast stations were developed in the past. In such techniques, the image data is compressed by orthogonal transformation such as discrete cosine transformation and motion compensation on the basis of standards such as MPEG (Moving Picture Experts Group).

MPEG2 (ISO/IEC 13818-2) as an example thereof is a standard defined as a general-purpose image encoding standard. It is defined to cope with both interlaced scanning and progressive scanning and to cope with both a standard-resolution image and a high-precision image. The MPEG2 is widely employed by wide-ranged applications for professionals and consumers. In accordance with the MPEG2, it is possible to secure a high compression rate with high quality.

However, the MPEG2 is a high-quality encoding standard suitable for broadcast and does not cope with high-compression-rate encoding having an encoding quantity smaller than that of the MPEG1. Therefore, in consideration of needs for the high-compression-rate encoding having an encoding quantity smaller than that of the MPEG1, an encoding scheme is standardized on the basis of MPEG4 (ISO/IEC 14496-2).

H26L (ITU-T Q6/16 VCEG) designed to encode images for TV conferences has been standardized and the encoding scheme of taking in various functions based the H26L to secure higher encoding efficiency has been standardized as Joint Model of Enhanced-Compression Video Coding by an action of the MPEG4, which were established as H.264 and MPEG4 Part 10 (AVC: Advanced Video Coding).

A motion compensation of dividing an image frame into blocks and predicting a motion from an encoded frame has been employed in the image encoding scheme based on the H.264/AVC.

As such a type of technique, for example, in JP-A-2004-241957, simple SATDs (Sum of Absolute Transformed Differences) are calculated from differences between pixel data in a motion compensating block of the present frame and pixel data in a motion compensating block of a reference frame in detecting a motion vector and a motion predicting and compensating circuit specifies the motion vector having the minimum estimated value defined using the simple SATDs.

SUMMARY OF THE INVENTION

However, as described above, the SATD having a higher precision in motion detection than the SAD (Sum of Absolute Differences) is more frequently used for the motion detection with a half-pixel precision and a quarter-pixel precision in the motion compensating and detecting circuit. In the SATD, the Hadamard transform is used and thus the amount of operations increases in comparison with the SAD. Therefore, there is a problem that a large amount of operations is required for the motion detection with the half-pixel precision and the quarter-pixel precision.

Therefore, there is a need for reducing an amount of operations accompanied with a motion vector detection.

According to an embodiment of the invention, there is provided a motion vector detecting device including: a motion predicting and compensating means for calculating cost values of a plurality of motion vectors, which is candidates of an optimal motion vector, with a first pixel precision every prediction mode and calculating the optimal motion vector with a second pixel precision and a cost value of the optimal motion vector with the second pixel precision on the basis of a gradient of the cost values.

Accordingly, the cost value of the optimal motion vector with the second pixel precision is calculated on the basis of the gradient of the plural cost values by the motion predicting and compensating means.

According to another embodiment of the invention, there is provided a motion vector detecting device including: a motion predicting and compensating means for calculating cost values of a plurality of motion vectors, which is candidates of an optimal motion vector, with a first pixel precision every prediction mode and calculating the optimal motion vector with a second pixel precision and a cost value of the optimal motion vector with the second pixel precision using highest N (where N=1, 2, 3, . . . ) cost values with the first pixel precision.

Accordingly, the cost value of the optimal motion vector with the second pixel precision is calculated on the basis of the highest N cost values by the motion predicting and compensating means.

According to another embodiment of the invention, there is provided a motion vector detecting method including the steps of: calculating cost values of a plurality of motion vectors, which is candidates of an optimal motion vector, with a first pixel precision every prediction mode; and calculating the optimal motion vector with a second pixel precision and a cost value of the optimal motion vector with the second pixel precision on the basis of a gradient of the cost values.

Accordingly, the cost value of the optimal motion vector with the second pixel precision is calculated.

According to another embodiment of the invention, there is provided an image encoding device including: an encoding means for detecting an optimal mode to be provided to an encoding process from a plurality of first prediction modes and a plurality of second prediction modes every predetermined block by comparison of cost values of a cost function indicating an encoding efficiency and encoding image data in the optimal mode; and a motion predicting and compensating means for calculating the cost values of a plurality of motion vectors, which is candidates of an optimal motion vector, with a first pixel precision every first prediction mode and calculating the optimal motion vector with a second pixel precision and a cost value of the optimal motion vector with the second pixel precision on the basis of a gradient of the cost values.

Accordingly, the cost value of the optimal motion vector with the second pixel precision is calculated on the basis of the gradient of the plural cost values by the motion predicting and compensating means.

According to another embodiment of the invention, there is provided a program instructing a computer to perform the steps of: detecting an optimal mode to be provided to an encoding process from a plurality of first prediction modes and a plurality of second prediction modes every predetermined block by comparison of cost values of a cost function indicating an encoding efficiency; calculating the cost values of a plurality of motion vectors, which is candidates of an optimal motion vector, with a first pixel precision every first prediction mode to encode image data in the optimal mode; and calculating the optimal motion vector with a second pixel precision and a cost value of the optimal motion vector with the second pixel precision on the basis of a gradient of the cost values.

Accordingly, the cost value of the optimal motion vector with the second pixel precision is calculated on the basis of the gradient of the plural cost values.

According to the above-mentioned configurations of the invention, it is possible to provide a motion vector detecting device, a motion vector detecting method, an image encoding device, and a program capable of reducing an amount of operations accompanied with a detection of a motion vector.

DESCRIPTION OF THE PREFERRED EMBODIMENTS

Hereinafter, preferred embodiments (hereinafter, simply referred to as "embodiment") of the invention will be described in detail with reference to the accompanying drawings.

An image encoding device according to an embodiment of the invention serves to detect the optimal mode to be provided to an encoding process from plural first prediction modes and plural second prediction modes every predetermined unit by comparison of cost values of a cost function indicating an encoding efficiency and to encode image data in the optimal mode.

The image encoding device includes a motion predicting and compensating circuit configured to calculate cost values of a plurality of motion vectors, which is candidates of an optimal motion vector, with a first pixel precision every first prediction mode and to calculate an optimal motion vector with a second pixel precision and a cost value of the optimal motion vector with the second pixel precision on the basis of a gradient of the cost values.

Alternatively, the image encoding device includes a motion predicting and compensating circuit configured to calculate cost values of a plurality of motion vectors, which is candidates of an optimal motion vector, with a first pixel precision every first prediction mode and to calculate an optimal motion vector with a second pixel precision and a cost value of the optimal motion vector with the second pixel precision on the basis of priority of the highest N cost values, in which the cost values with the first pixel precision are prioritized.

Alternatively, the image encoding device includes a motion predicting and compensating circuit configured to calculate the cost values of a plurality of motion vectors, which is candidates of the optimal motion vector, with the first pixel precision every first prediction mode and to calculate the optimal motion vector with the second pixel precision and a cost value of the optimal motion vector with the second pixel precision on the basis of priority of three cost values from the lowest cost value among the cost values with the first pixel precision.

Here, the first pixel precision may be a coarse pixel precision and the second pixel precision may be a pixel precision finer than the first pixel precision.

An embodiment applied to the AVC (Advanced Video Coding) will be described now.

Figure 1:
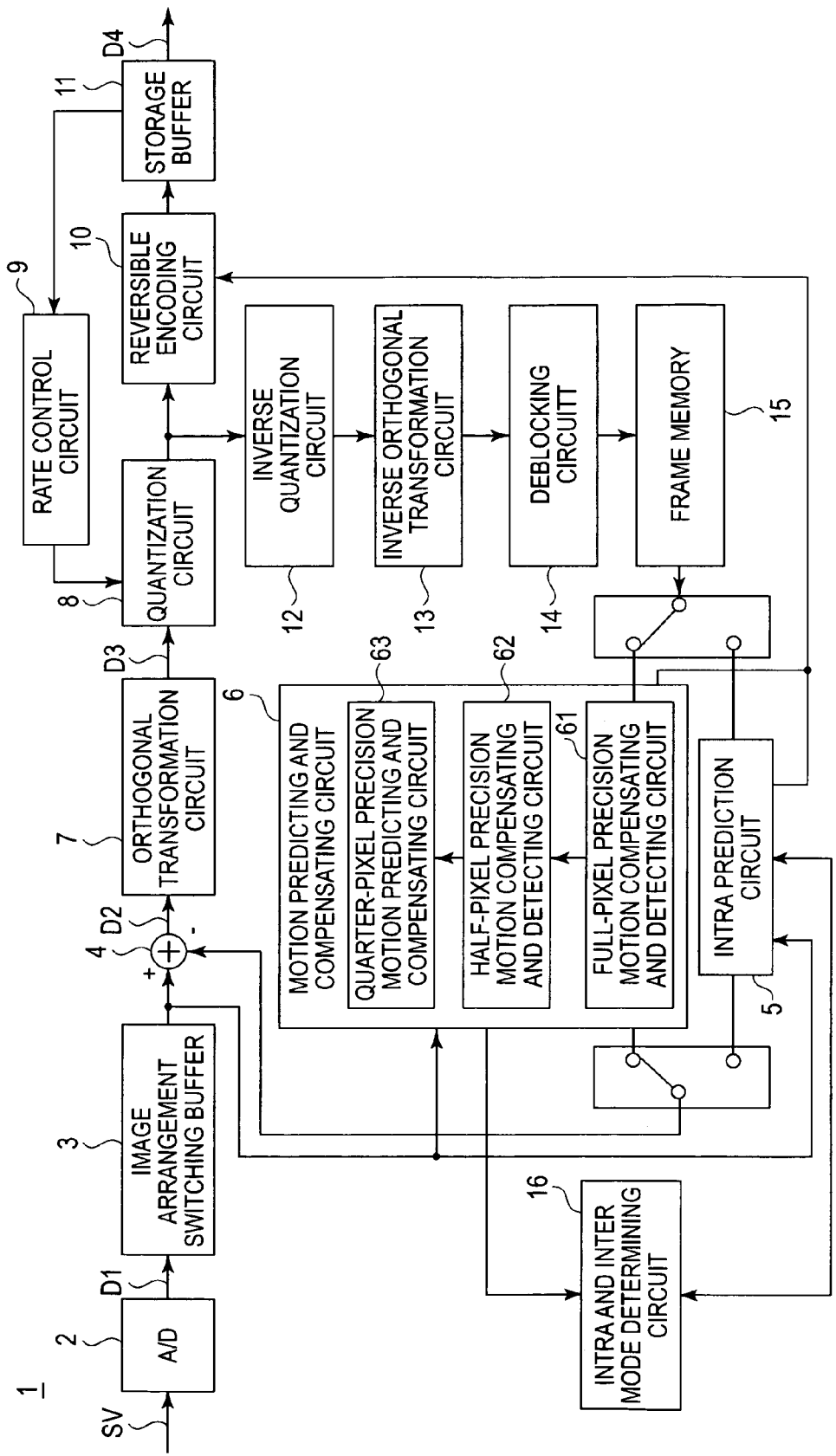
FIG. 1 is a diagram illustrating a configuration of an image encoding device employing a motion vector detecting device according to an embodiment of the invention.

FIG. 1 shows a configuration of an image encoding device employing a motion vector detecting device according to an embodiment of the invention. Here, an image encoding device based on the AVC is exemplified.

The image encoding device 1 selects the optimal prediction mode from plural intra prediction modes and plural inter prediction modes and subtracts predicted values in the selected prediction mode from image data to generate differential data. Then, by performing an orthogonal transformation process, a quantization process, a variable-length encoding process on the differential data, the image encoding device encodes the image data by the use of intra encoding and inter encoding. Hereinafter, the configuration and operation thereof will be described in detail.

As shown in FIG. 1, the image encoding device 1 includes an analog-digital (A/D) conversion circuit 2, an image arrangement switching buffer 3, a subtraction circuit 4, an intra prediction circuit 5, a motion predicting and compensating circuit 6 as a motion predicting and compensating means corresponding to a motion vector detecting device, an orthogonal transformation circuit 7, a quantization circuit 8, a rate control circuit 9, a reversible encoding circuit 10, a storage buffer 11, an inverse quantization circuit 12, an inverse orthogonal transformation circuit 13, a deblocking filter 14, a frame memory 15, and an intra and inter mode determining circuit 16. The motion predicting and compensating circuit 6 includes a full-pixel precision motion compensating and detecting circuit 61, a half-pixel precision motion compensating and detecting circuit 62, and a quarter-pixel precision motion predicting and compensating circuit 63. The A/D conversion circuit 2, the image arrangement switching buffer 3, the subtraction circuit 4, the intra prediction circuit 5, the orthogonal transformation circuit 7, the quantization circuit 8, the rate control circuit 9, and the reversible encoding circuit 10 constitute an encoding means.

In this configuration, the A/D conversion circuit 2 converts a video signal SV into a digital signal and outputs image data D1. The image arrangement switching buffer 3 receives the image data D1, switches the arrangement of a frame of the image data D1 in accordance with a GOP (Group of Pictures) structure associated with the encoding process, and outputs the switched image data. The subtraction circuit 4 receives the image data D1 output from the image arrangement switching buffer 3 and generates and outputs differential data D2 from predicted values generated by the intra prediction circuit 5 in intra encoding. In general, the intra prediction circuit 5 predicts an image at a different position using an image sample in the same image.

On the other hand, the subtraction circuit generates and outputs differential data D2 from predicted values generated by the motion predicting and compensating circuit 6 in inter encoding.

The orthogonal transformation circuit 7 receives the differential data D2 output from the subtraction circuit 4, performs an orthogonal transformation process such as a discrete cosine transform (DCT) and Karhunen-Loeve transform on the data, and outputs transformation coefficient data D3 as the process result. The quantization circuit 8 quantizes and outputs the transformation coefficient data D3 with a quantization scale based on the rate control of the rate control circuit 9.

The reversible encoding circuit 10 performs a reversible encoding process on the output data of the quantization circuit 8 by variable-length encoding, arithmetic encoding, and the like and outputs the resultant data. The reversible encoding circuit 10 acquires information on the intra prediction modes associated with the intra encoding and information on the motion vectors associated with the inter encoding from the intra prediction circuit 5 and the motion predicting and compensating circuit 6, sets such information as header information of the output data D4, and outputs the output data. The intra prediction mode is also called inter-image prediction encoding.

The storage buffer 11 stores the output data D4 of the reversible encoding circuit 10 and outputs the stored data in accordance with a transmission rate of a transmission path. The rate control circuit 9 monitors an encoding quantity generated by the encoding process by monitoring empty capacity of the storage buffer 11. The generated encoding quantity is controlled by changing the quantization scale in the quantization circuit 8 as the monitoring result.

The inverse quantization circuit 12 performs an inverse quantization process on the output data of the quantization circuit 8 and thus reproduces the input data of the quantization circuit 8. The inverse orthogonal transformation circuit 13 performs an inverse orthogonal transformation process on the output data of the inverse quantization circuit 12 and thus reproduces the input data of the orthogonal transformation circuit 7.

The deblocking filter 14 removes a block distortion from the output data of the inverse orthogonal transformation circuit 13 and outputs the resultant data. For example, in the H.264/AVC, the block distortion is adaptively removed by the deblocking filter 14 before the decoded image is stored in the frame memory 15.

The frame memory 15 properly adds a predicted value, which is generated by the intra prediction circuit 5 or the motion predicting and compensating circuit 6, to the output data of the deblocking filter 14 and records the resultant data as reference image information.

The motion predicting and compensating circuit 6 detects a motion vector of the image data output from the image arrangement switching buffer 3 on the basis of a predicted frame (reference frame) based on the reference image information stored in the frame memory 15. The motion predicting and compensating circuit compensates for the motion of the reference image information stored in the frame memory 15 by the use of the detected motion vector and detects the optimal inter prediction mode. When the encoding process is performed in the inter prediction mode, the motion predicting and compensating circuit generates predicted image information in the optimal mode and outputs the predicted value based on the predicted image information to the subtraction circuit 4.

The intra prediction circuit 5 detects the optimal intra prediction mode on the basis of the reference image information stored in the frame memory 15 in the intra encoding. When the encoding process is performed in the intra prediction mode, the intra prediction circuit generates the predicted value of the predicted image information from the reference image information in the optimal mode and outputs the generated predicted value to the subtraction circuit 4.

In this way, the image encoding device 1 generates the differential data D2 based on the motion compensation associated with the inter prediction and the differential data D2 based on the intra prediction by the inter encoding process and the intra encoding process, performs the orthogonal transformation process, the quantization process, and the variable-length encoding process on the differential data D2, and transmits the resultant data.

Here, in the AVC, a high-quality mode (high complexity mode) based on multi-pass encoding and a high-rate mode (low complexity mode) based on one-pass encoding are defined by the use of the Joint Model (AVC reference encoding scheme) associated with the AVC and the optimal mode is selected on the basis of the definition to perform the encoding process.

In the low complexity mode, a cost function indicating an encoding efficiency is defined by the following expression and the optimal mode is detected by comparison of cost values Cost(mode) obtained by the cost function.

$$\text{Cost(mode)} = \text{SA(T)D} + \text{SA(T)D0} \tag{1}$$

Here, the SA(T)D is a difference value between an original image and a predicted image and employs a sum of absolute differences in pixel value between the original image and the predicted image.

The SA(T)D0 is an offset value given to the difference value SA(T)D, is based on a header bit and the cost as a weight for determining a mode, and represents a data quantity to be provided to transmission of accessory information.

More specifically, the sum of absolute differences SAD is expressed for macro blocks by the following expression and employs difference values between the original image and the predicted image in the prediction modes Mode.

$$SAD = \sum_{i=0}^{15} \sum_{j=0}^{15} |Org(i, j) - Pred(\text{Mode}, i, j)| \quad (2)$$

Instead of the sum of absolute differences SAD resulting from Expression (2), SATD(mode) obtained by the following expression may be used as the sum of differences.

$$SATD(\text{mode}) = \sum_{i=0}^{15} \sum_{j=0}^{15} |Hadamard(Org(i, j) - Pred(\text{Mode}, i, j)| \quad (3)$$

Here, Hadamard( ) represents the Hadamard transform operation of applying a Hadamard transform matrix to a target matrix, as indicated by the following expression.

$$\text{Hadamard}(A) = H^T A H \quad (4)$$

The Hadamard transform matrix is expressed by Expression (5), where $H^T$ is a transposed matrix of the Hadamard transform matrix.

$$H = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (5)$$

The offset value SA(T)D0 is expressed in a forward prediction mode by the following expression.

SA(T)D0=QP0(QP)·(2×code_number_of_
ref_idx_fwd+Bit_to_code_MVDFW) (6)

Here, QP0(QP) is a function of transforming a quantization parameter QP to a quantization scale, MVDFW is a motion vector associated with the forward prediction, and Bit_to_code is an encoding quantity of a bit stream associated with the motion vector.

The offset value SA(T)D0 is expressed in a backward prediction mode by the following expression.

SA(T)D0=QP0(QP)×Bit_to_code_MVDBW (7)

Here, MVDBW is a motion vector associated with the backward prediction.

The offset value SA(T)D0 is expressed in a bidirectional prediction mode by the following expression.

SA(T)D0=QP0(QP)·(2×code_number_of_
ref_idx_fwd+Bit_to_code_forward_Blk_size+
Bit_to_code_backward_Blk_size+Bit_to_
code_MVDFW+Bit_to_code_MVDBW) (8)

Here, Bit_to_code_forward_Blk_size and Bit_to_code_backward_Blk_size are encoding quantities of bit streams necessary for transmitting information on motion compensating blocks associated with the forward prediction and the backward prediction, respectively.

In the direct mode, the offset value SA(T)D0 is expressed by the following expression.

SA(T)D0=−16×QP0(QP) (9)

In the intra 4×4 prediction mode, the offset value SA(T)D0 is expressed by the following expression.

SA(T)D0=24×QP0(QP) (10)

A motion vector having the minimum cost value Cost, which is applied to the detection of the motion vector and is expressed by the following expression, is detected from the cost function.

Cost=SA(T)D+SA(T)D0

SA(T)D0=QP0(QP)·(Bits_to_code_vector+2×code_
number_of_ref_index_fwd) (11)

Accordingly, when the optimal mode is detected in the low complexity mode, the intra prediction circuit 5 and the motion predicting and compensating circuit 6 of the encoding device 1 calculate the cost values Cost of all the prediction modes of the intra encoding and the inter encoding using a brightness signal. The encoding device selects a prediction mode having the lowest cost value and detects the optimal mode of the brightness signal. Accordingly, when the intra encoding is selected, the cost values of color-difference signals in the intra prediction modes are calculated and the intra prediction mode based on the lowest cost value is set as the optimal mode of the color-difference signals by comparison of the calculation results.

Various means for selecting the prediction mode using the cost function are disclosed, for example, in JP-A-2003-230149.

Therefore, the encoding device detecting the optimal mode to be provided to the encoding process from plural intra prediction modes and plural inter prediction modes by comparison of the cost values based on the cost function representing an encoding efficiency every macro block and encoding image data in the optimal mode has, for example, the following operations.

The quarter-pixel-precision motion predicting and compensating circuit 63 calculates cost values of plural motion vectors, which are candidates of an optimal motion vector, with the half-pixel precision every inter prediction mode and calculates the optimal motion vector with the quarter-pixel precision and a cost value of the optimal motion vector with the quarter-pixel precision on the basis of a gradient of the cost values.

The quarter-pixel-precision motion predicting and compensating circuit 63 calculates the cost values of plural motion vectors, which are candidates of the optimal motion vector, with the half-pixel precision every inter prediction mode and calculates the optimal motion vector with the quarter-pixel precision and a cost value of the optimal motion vector with the quarter-pixel precision on the basis of priority of the highest N cost values, in which the cost values with the half-pixel precision are prioritized.

The quarter-pixel-precision motion predicting and compensating circuit 63 calculates the cost values of plural motion vectors, which are candidates of the optimal motion vector, with the half-pixel precision every inter prediction mode and calculates the optimal motion vector with the quarter-pixel precision and a cost value of the optimal motion vector with the quarter-pixel precision on the basis of priority of three cost values from the lowest cost value among the cost values with the half-pixel precision.

Figure 2:
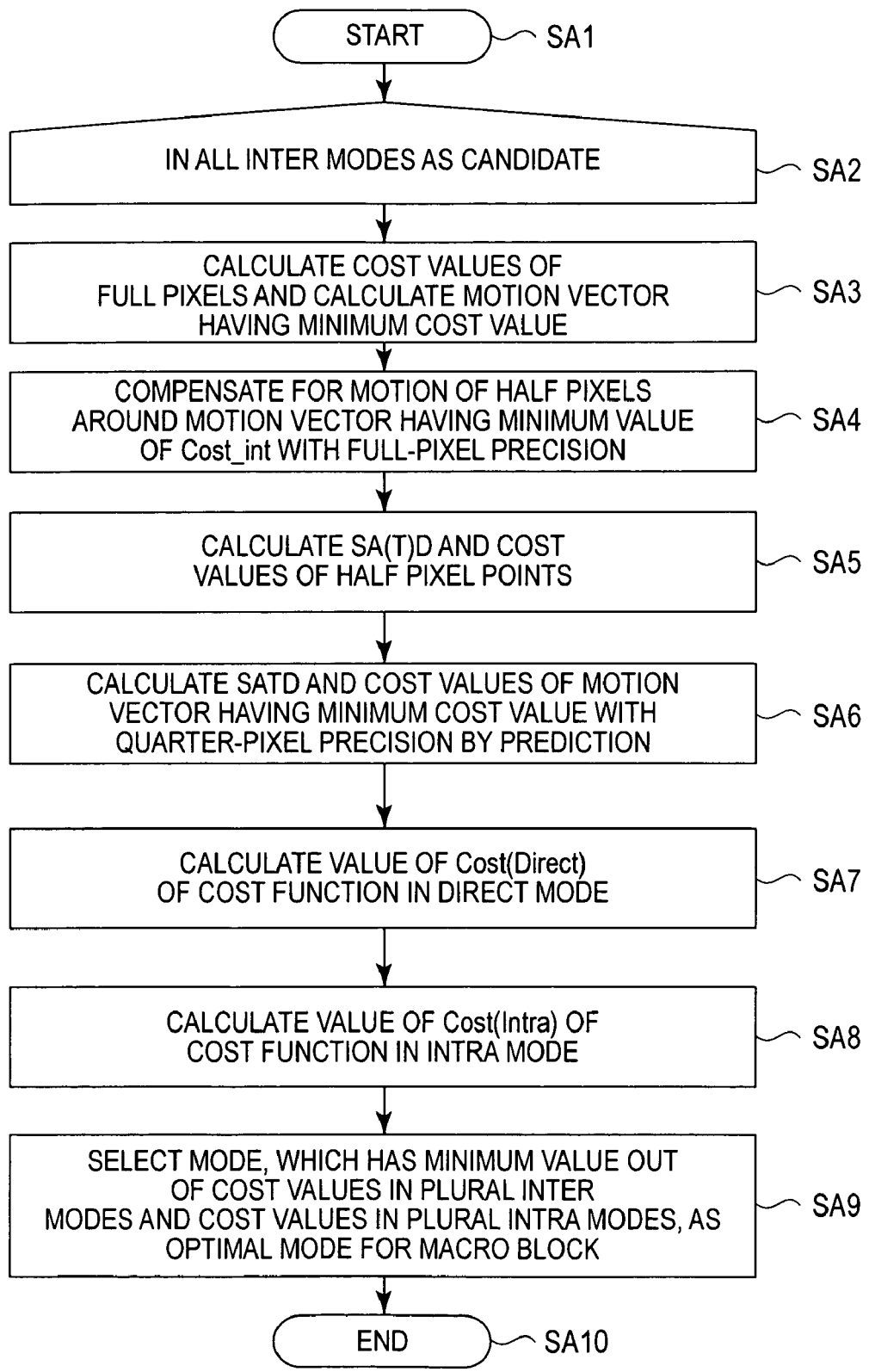
FIG. 2 is a flowchart illustrating a sequence of processes associated with a selection of the optimal mode in the image encoding device employing the motion vector detecting device according to the embodiment of the invention.

Hereinafter, a sequence of processes of selecting the optimal mode in the image encoding device employing the motion vector detecting device according to an embodiment of the invention will be described with reference to the flowchart shown in FIG. 2.

When the sequence is started (SA1), the motion predicting and compensating circuit 6 calculates the cost values Cost of full pixels using the full-pixel-precision motion compensating and detecting circuit 61 (SA3) in all the inter prediction modes which are candidates (SA2). At this time, the SA(T)Ds of the motion vectors as candidates with the full-pixel precision are calculated by the use of Expressions (2) and (3). For example, when a range of 100 in the vertical direction and 100 in the horizontal direction with the full-pixel precision is searched, the operation of SA(T)D is carried out 100×100 times. The cost values Cost are calculated from Expression (11) using the SA(T)Ds and the motion vector having the lowest cost value Cost is calculated (SA3).

Figure 4:
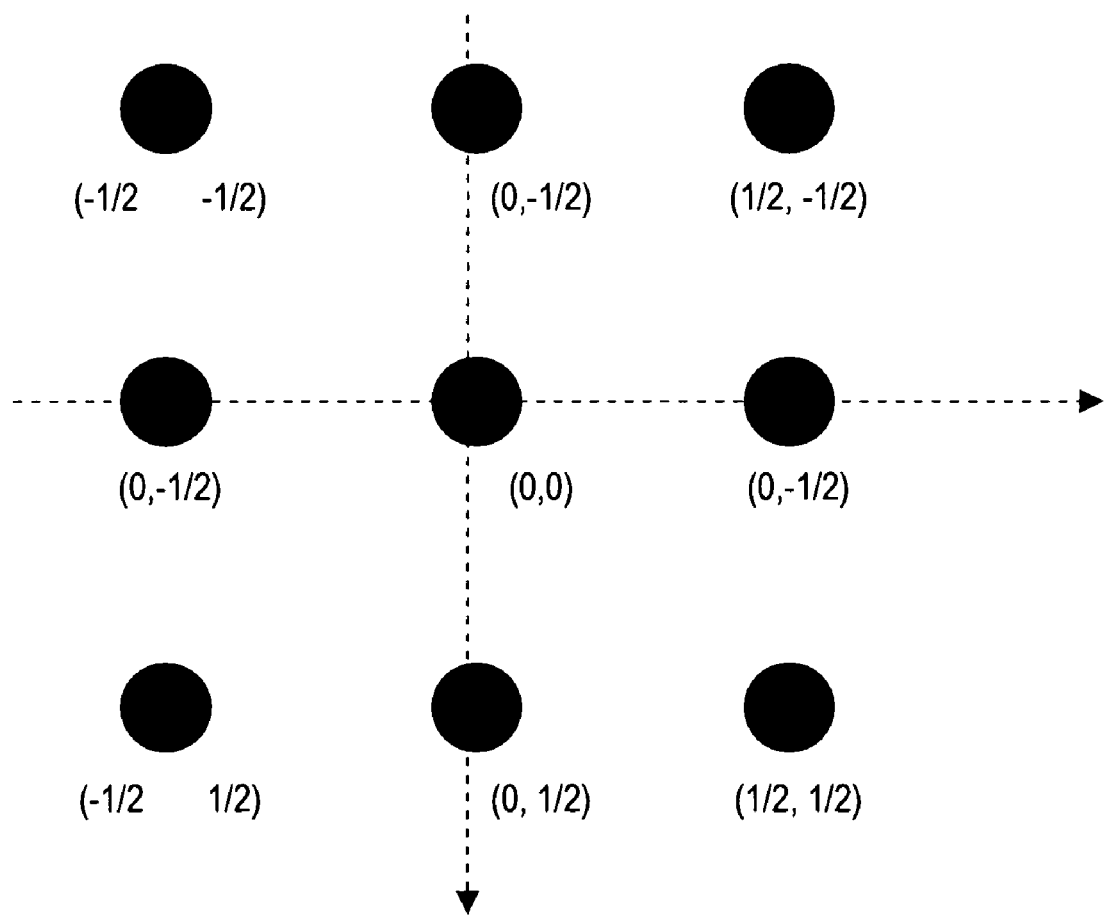
FIG. 4 is a diagram illustrating an arrangement of half pixels.

The half-pixel-precision motion compensating and detecting circuit 62 compensates for motions of the motion vectors which are candidates of points with the half-pixel precision around the motion vector having the lowest cost value Cost with the full-pixel precision (SA4). That is, nine points with the half-pixel precision are motion vectors as the candidates, for example, as shown in FIG. 4. In this case, pixels of the points with the half-pixel precision are prepared using a 6-tap FIR filter.

Subsequently, the SA(T)D and the cost value Cost of the respective half-pixel points are calculated (SA5).

Then, the quarter-pixel-precision motion predicting and compensating circuit 63 predicts the optimal motion vector with the quarter-pixel precision from the SA(T)Ds and the cost values Cost with the half-pixel precision and calculates the SA(T)D and the cost value Cost thereof by prediction (SA6). Details thereof will be described later.

Subsequently, the motion predicting and compensating circuit 6 calculates the cost values Cost in the direct mode (SA7). The intra prediction circuit 5 calculates the cost values Cost in all the intra modes (SA8). By selecting the mode having the minimum cost value Cost from the inter prediction modes, the direct modes, and the intra prediction modes, the optimal mode is determined (SA9). Then, the sequence is ended (SA10). The direct modes conceptually include a temporal direct mode and a spatial direct mode.

Figure 3:
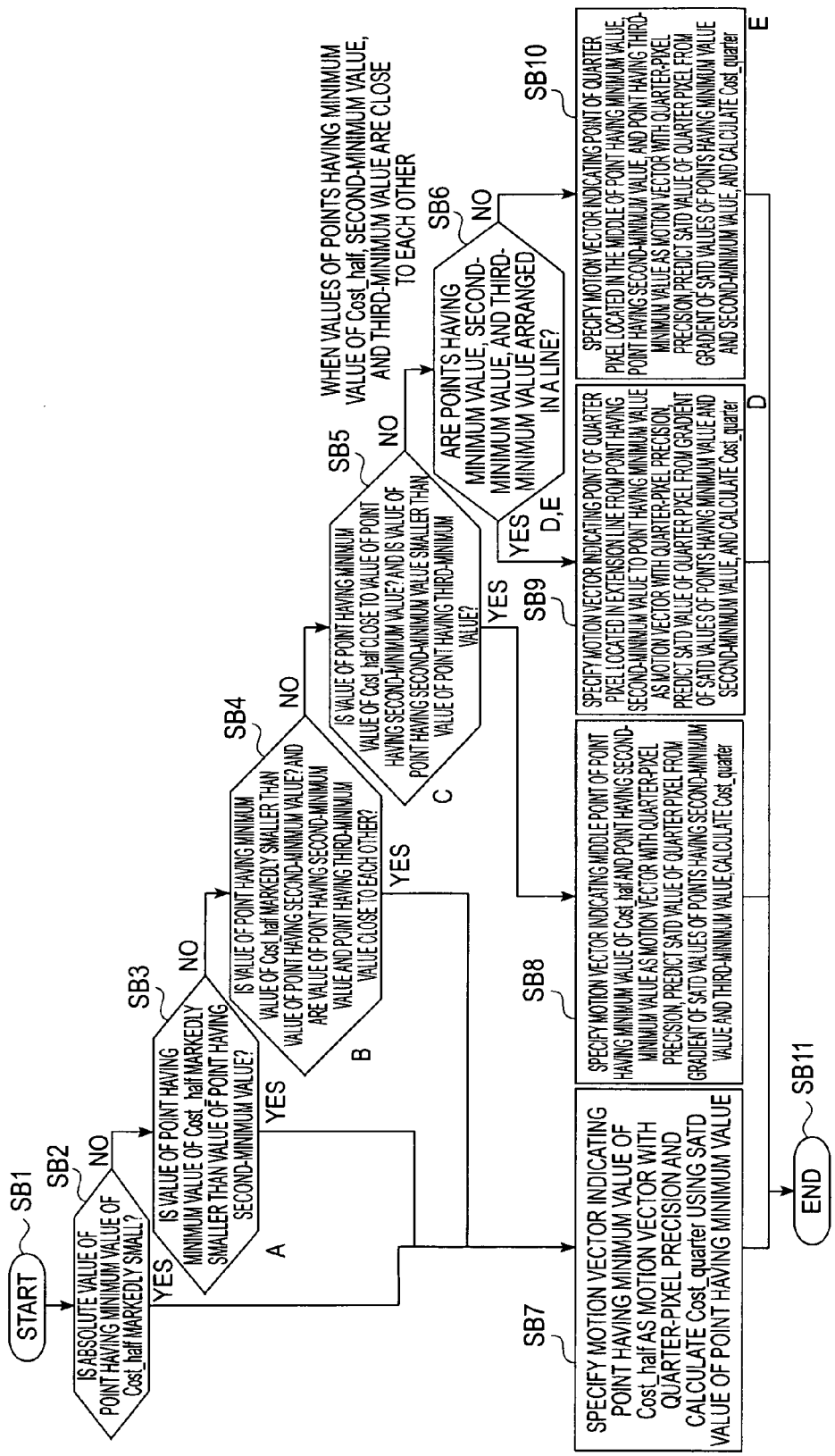
FIG. 3 is a flowchart specifically illustrating a sequence of processes performed by a motion predicting and compensating circuit with a quarter-pixel precision in the image encoding device according to the embodiment of the invention.

A sequence of processes carried out by the quarter-pixel-precision motion predicting and compensating circuit 63 of the image encoding device according to the embodiment of the invention will be described in detail with reference to the flowchart shown in FIG. 3.

Hereinafter, the cost value Cost with the half-pixel precision is called Cost_half and the cost value Cost with the quarter-pixel precision is called Cost_quarter. In the sequence shown in FIG. 3, the SA(T)D and the Cost_quarter of the motion vectors with the quarter-pixel precision are derived from the Cost_half.

That is, when the sequence is started (SB1), the quarter-pixel-precision motion predicting and compensating circuit 63 first determines whether the absolute value of the point having the minimum value of Cost_half is markedly small (SB2). When the determination result of SB2 is YES, the point having the minimum value of Cost_half is specified as the motion vector with the quarter-pixel precision, the minimum SATD value of the half pixel is set as the SATD value of the motion vector, and the cost value Cost_quarter is calculated using the SATD value of the minimum point (SB7).

When the determination result of SB2 is NO, it is determined whether the SATD value of the point having the minimum value of Cost_half is markedly smaller than the SATD value of the point having the second-minimum value of Cost_half (SB3). Here, when the determination result is YES, the point having the minimum value of Cost_half is specified as the motion vector with the quarter-pixel precision, the minimum SATD value of the half pixel is set as the SATD value of the motion vector, and the cost value Cost_quarter is calculated using the SATD value of the point having the minimum value (SB7), similarly to the process as the previous determination result.

Figure 5A:
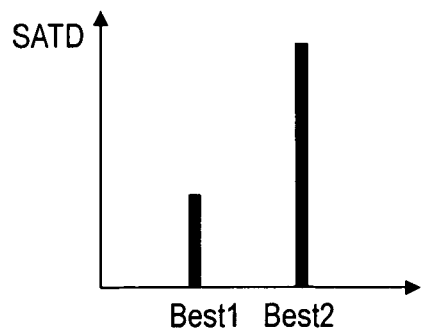
FIGS. 5A to 5D are conceptual diagrams illustrating specification of a motion vector indicating a point with a quarter-pixel precision as a motion vector to be used for motion compensation by comparison of SATD values of half pixels.

That is, for example, as shown in FIG. 5A, when the SATD ratio of Best1 (or the absolute value of difference) is extremely small as the comparison result of two points Best1 and Best2, The position of Best1 (that is, the position which is the best with the half-pixel precision) is output as the motion vector with the quarter-pixel precision and Cost_quarter is calculated using the SATD value of the point having the minimum value. Here, "extremely small" means a case where the absolute value of Best1 is 770 or the like.

When the determination result of SB3 is NO, it is determined whether a difference between the SATD value of the point having the minimum value of Cost_half and the SATD value of the point having the second-minimum value of Cost_half is small and the SATD value of the point having the second-minimum value and the SATD value of the point having the third-minimum value are close to each other (the difference therebetween is small) (SB4). Here, when the determination result is YES, the SATD value of the point having the minimum value of Cost_half is specified as the SATD value of the motion vector with the quarter-pixel precision and the cost value Cost_quarter is calculated using the SATD value of the point having the minimum value (SB7), similarly to the process as the previous determination result.

Figure 5B:
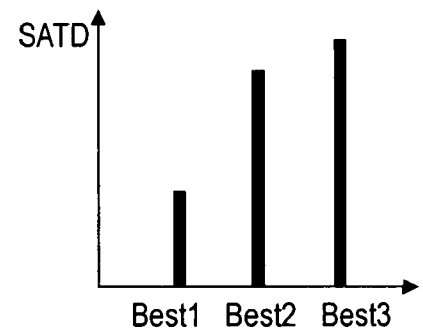

That is, for example, as shown in FIG. 5B, when the SATD ratio of Best1 and Best2 is small and the SATD values of Best2 and Best3 are close to each other (the difference therebetween is small) as the comparison result of three points Best1 to Best3, the position of Best1 is output as the motion vector with the quarter-pixel precision and the Cost_quarter is calculated using the SATD value of the point having the minimum value. Here, "the SATD ratio of Best1 and Best2 is small" means a case where the ratio is 0.8 or the like and "the difference between Best2 and Best3 is small" means a case where the difference is equal to or less than 1000 or the like.

When the determination result of SB4 is NO, it is determined whether the value of the point having the minimum value of Cost_half is close to the value of the point having the second-minimum value and the difference between the value of the point having the second-minimum value and the value of the point having the third-minimum value is small (SB5). Here, when the determination result is YES, a middle point between the point having the minimum value of Cost-half and the point having the second-minimum value is specified as the motion vector with the quarter-pixel precision and the value of Cost_quarter is calculated by predicting the SATD value of the quarter pixel on the basis of the gradient of the SATD values of the points having the second-minimum and third-minimum values (SB8).

Figure 5C:
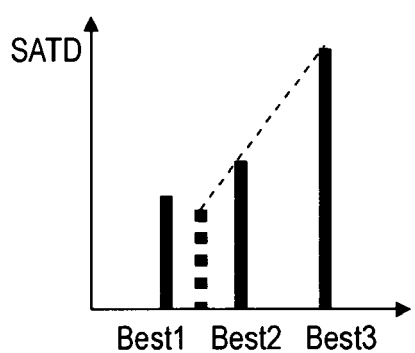

That is, as shown in FIG. 5C, when the SATD values of Best1 and Best2 are close to each other (the ratio or difference thereof is small or the like) and the SATD value of Best2 is extremely smaller than that of Best3 (the ratio or difference thereof is small or the like) as the comparison result of, for example, three points Best1 to Best3, a middle point between Best1 and Best2 is output as the motion vector with the quarter-pixel precision and the Cost_quarter is calculated using the SATD value of the point having the minimum value. The SATD value is calculated from the gradient of Best2 and Best3.

Here, "the ratio of Best1 and Best2 is small" means a case where the ratio is 0.9 or the like and "the ratio of Best2 and Best3 is small" means a case where the ratio is 0.99 or the like. "The difference between Best1 and Best2 is small" means a case where the difference is 500 or the like and "the difference between Best2 and Best3 is small" means a case where the difference is 250 or the like.

When the determination result of SB5 is NO, it corresponds to a case where the SATD value of the point having the minimum value of Cost_half, the SATD value of the point having the second-minimum value, and the SATD value of the point having the third-minimum value are close to each other (the ratio or difference is small or the like). At this time, it is determined whether the point having the minimum value, the point having the second-minimum value, and the point having the third-minimum value are arranged in this order in a line (SB6). When the determination result of SB6 is YES, for example, a quarter-pixel point located in an extension line from the point having the second-minimum value to the point having the minimum value is specified as the motion vector with the quarter-pixel precision, the SATD value of the quarter pixel is predicted from the gradient of the SATD values of the point having the minimum value and the point having the second-minimum value, and the value of Cost_quarter is calculated (SB9).

Figure 5D:
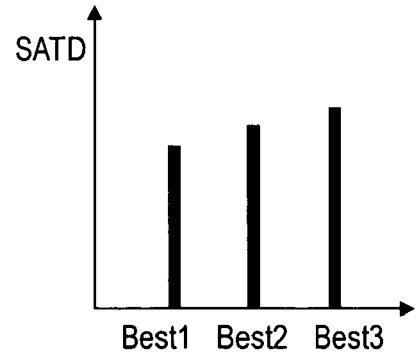

That is, as shown in FIG. 5D, when the SATD values of Best1 and Best2 are close to each other (the ratio or difference thereof is small or the like) and the SATD values of Best2 and Best3 are close to each other (the ratio or difference thereof is small or the like) as the comparison result of, for example, three points Best1 to Best3, it is determined whether the points are arranged in a line.

Figure 6A:
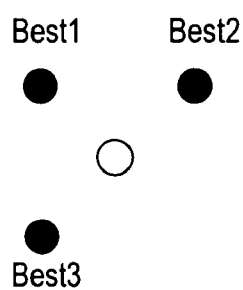
FIGS. 6A and 6B are other conceptual diagrams illustrating specification of a motion vector indicating a point with a quarter-pixel precision as a motion vector to be used for motion compensation by comparison of SATD values of half pixels.

As shown in FIG. 6A, when it is determined that the points are arranged in a line, for example, a point (for example, externally inserted point) other than the points Best1 to Best3 is output as the motion vector with the quarter-pixel precision and the value of Cost_quarter is calculated using the SATD value of the point having the minimum value of Cost_half.

Here, "the ratio of Best1 and Best2 is small" means a case where the ratio is 0.99 or the like and "the ratio of Best2 and Best3 is small" means a case where the ratio is 0.9 or the like. "The difference between Best1 and Best2 is small" means a case where the difference is 250 or the like and "the difference between Best2 and Best3 is small" means a case where the difference is 500 or the like.

When the determination result of SB6 is NO, a motion vector indicating a point with the quarter-pixel precision located in the middle of the point having the minimum value of Cost_half, the point having the second-minimum value, and the point having the third-minimum value is specified as the motion vector with the quarter-pixel precision, the SATD value of the quarter pixel is predicted from the gradient of the SATD values of the point having the minimum value and the second minimum value, and the value of Cost_quarter is calculated (SB10).

That is, as shown in FIG. 5D, when the SATD values of Best1 and Best2 are close to each other (the ratio or difference thereof is small or the like) and the SATD values of Best2 and Best3 are close to each other (the ratio or difference thereof is small or the like) as the comparison result of, for example, three points Best1 to Best3, it is determined whether the points are arranged in a line.

Here, "the ratio of Best1 and Best2 is small" means a case where the ratio is 0.99 or the like and "the ratio of Best2 and Best3 is small" means a case where the ratio is 0.99 or the like. "The difference between Best1 and Best2 is small" means a case where the difference is 250 or the like and "the difference between Best2 and Best3 is small" means a case where the difference is 250 or the like.

Figure 6B:

As shown in FIG. 6B, when the points are not arranged in a line but overlap with each other, a middle point of the points Best1 to Best3 is output as a motion vector with the quarter-pixel precision and the value of Cost_quarter is calculated using the SATD value of the point having the minimum value.

In this way, a series of processes is ended (SB11).

By arbitrarily combining the processes of SB7 to SB10, it is possible to calculate a motion vector with the quarter-pixel precision and the SATD value and cost value of the motion vector with the quarter-pixel precision from the cost values with the half-pixel precision.

That is, by combining some of (A) to (E) described below, it is possible to calculate a motion vector with the quarter-pixel precision and the SATD or SAD value and the cost value of the motion vector with the quarter-pixel precision from the cost values with the half-pixel precision.

(A) A motion vector indicating a point having the minimum SAD or SATD value is specified as a motion vector to be used for motion compensation when the absolute value of the minimum SAD or SATD value of half pixels is small or when the minimum SAD or SATD value of the half pixels is extremely smaller than the second-minimum SAD or SATD value. Then, the cost value of the motion vector is calculated using the minimum SAD or SATD value of the half pixels as an SAD or SATD value of the motion vector.

(B) A motion vector indicating a point having the minimum SAD or SATD value is specified as a motion vector to be used for motion compensation when the minimum SAD or SATD value of half pixels is smaller than the second-minimum SAD or SATD value and a difference between the second-minimum SAD or SATD value and the third-minimum SAD or SATD value is small. Then, the cost value of the motion vector is calculated using the minimum SAD or SATD value of the half pixels as an SAD or SATD value of the motion vector.

(C) A motion vector indicating a middle point between the point having the minimum SAD or SATD value and the point having the second-minimum SAD or SATD value is specified as a motion vector to be used for motion compensation when a difference between the minimum SAD or SATD value of half pixels and the second-minimum SAD or SATD value is small and a difference between the second-minimum SAD or SATD value and the third-minimum SAD or SATD value is great. Then, the SAD or SATD value of the motion vector is calculated from the relationship of the SAD or SATD values of three points and the cost value of the motion vector is calculated.

(D) A motion vector indicating a point with the quarter-pixel precision located in an extension line from the point having the second-minimum SAD or SATD value to the point having the minimum SAD or SATD value is specified as a motion vector to be used for motion compensation when a difference between the minimum SAD or SATD value of half pixels and the second-minimum SAD or SATD value is small, a difference between the second-minimum SAD or SATD value and the third-minimum SAD or SATD value is small, and the point having the minimum SAD or SATD value, the point having the second-minimum value, and the point having the third-minimum value are arranged in this order in a line. Then, an SAD or SATD value of the motion vector to be used for motion compensation is calculated from the relationship of the SAD or SATD values of three points and the cost value of the motion vector is calculated.

(E) A motion vector indicating a point with the quarter-pixel precision located in the middle of the point having the minimum SAD or SATD value, the point having the second-minimum value, and the point having the third-minimum value is specified as a motion vector to be used for motion compensation when a difference between the minimum SAD or SATD value of half pixels and the second-minimum SAD or SATD value is small, a difference between the second-minimum SAD or SATD value and the third-minimum SAD or SATD value is small, and the point having the minimum SAD or SATD value, the point having the second-minimum value, and the point having the third-minimum value are not arranged in a line. Then, an SAD or SATD value of the motion vector to be used for motion compensation is calculated from the relationship of the SAD or SATD values of three points and the cost value of the motion vector is calculated.

The combination of all (A) to (E) is the most effective. The combinations of (A)+(B)+(C)+(D), (A)+(B)+(C), (A)+(B), and (A) become less effective in this order. However, the invention is not limited to these combinations. When the conditions are not satisfied, the best point with the half-pixel precision may be used as a point with the quarter-pixel precision.

Figure 7:
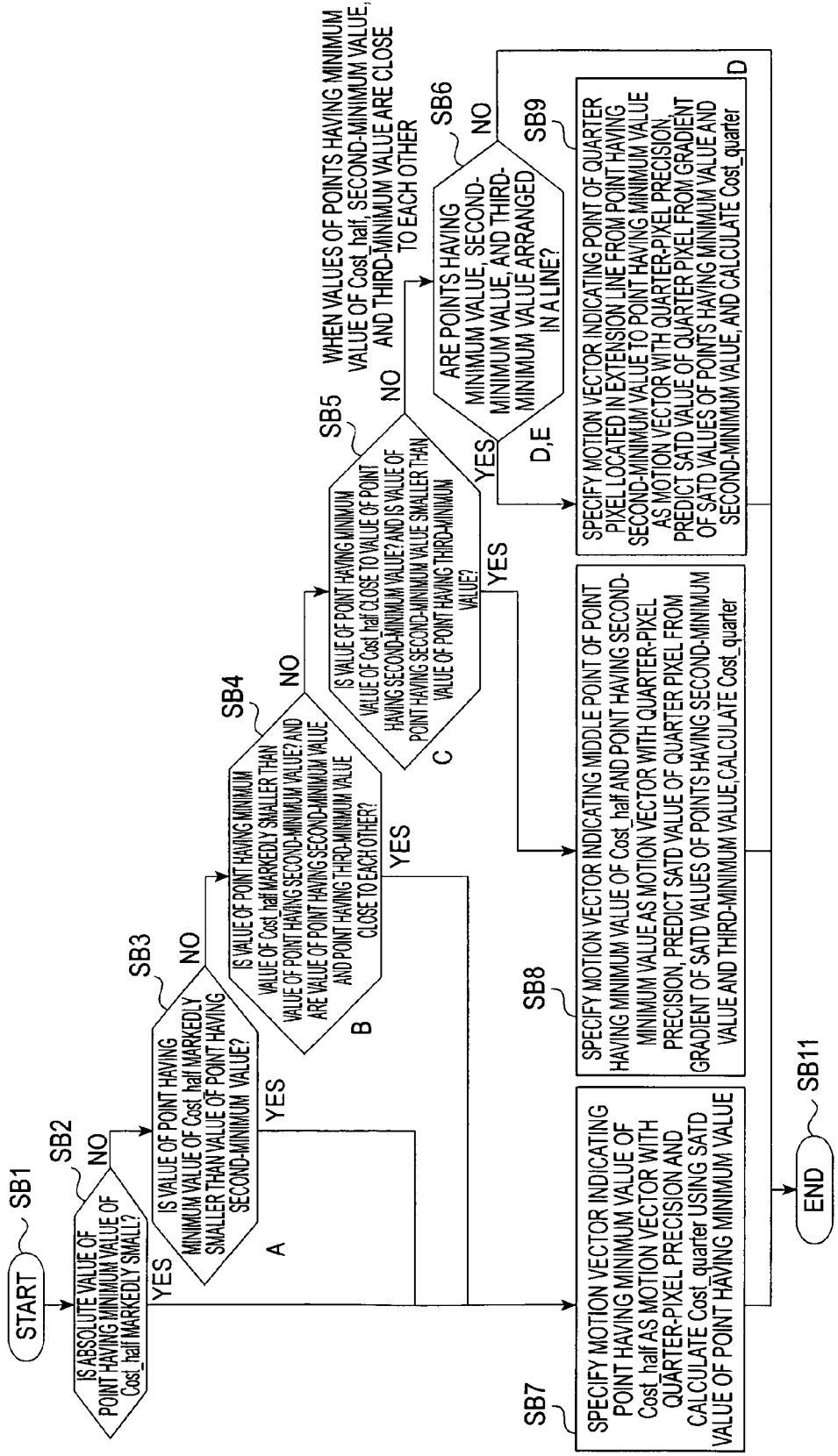
FIG. 7 is a flowchart specifically illustrating an advanced sequence of processes performed by a quarter-pixel-precision motion predicting and compensating circuit in the image encoding device according to the embodiment of the invention.

FIG. 7 shows a flowchart illustrating a sequence of processes when the combination of (A)+(B)+(C)+(D) is employed. Like reference numerals reference like processes in FIG. 3 and the repeated description is omitted. When the determination result of SB6 is NO, the sequence is ended (SB11).

Figure 8:
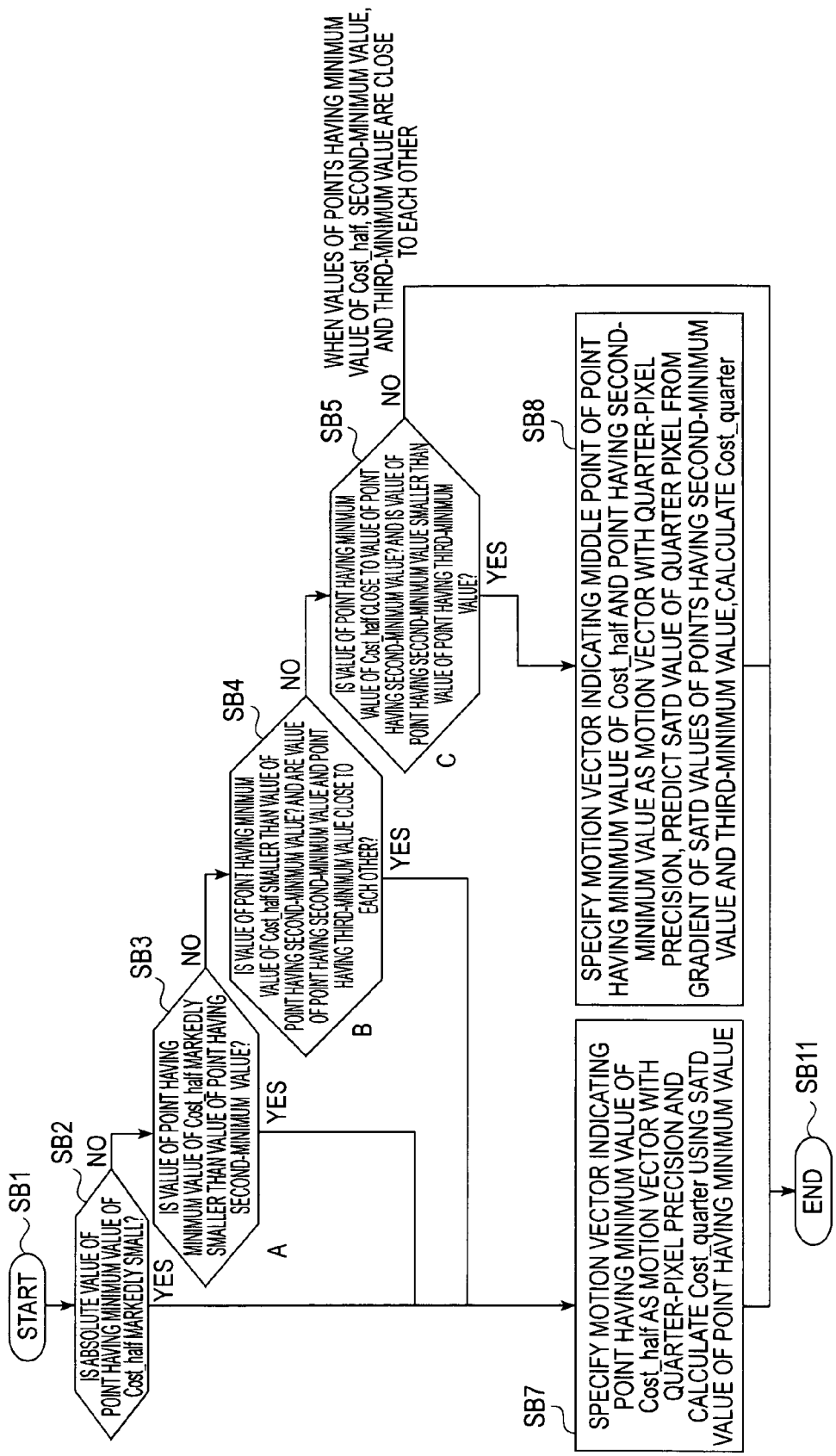
FIG. 8 is a flowchart specifically illustrating another advanced sequence of processes performed by the quarter-pixel-precision motion predicting and compensating circuit in the image encoding device according to the embodiment of the invention.

FIG. 8 shows a flowchart illustrating a sequence of processes when the combination of (A)+(B)+(C) is employed. Like reference numerals reference like processes in FIG. 3 and the repeated description is omitted. When The determination result of SB5 is NO, the sequence is ended (SB11).

Figure 9:
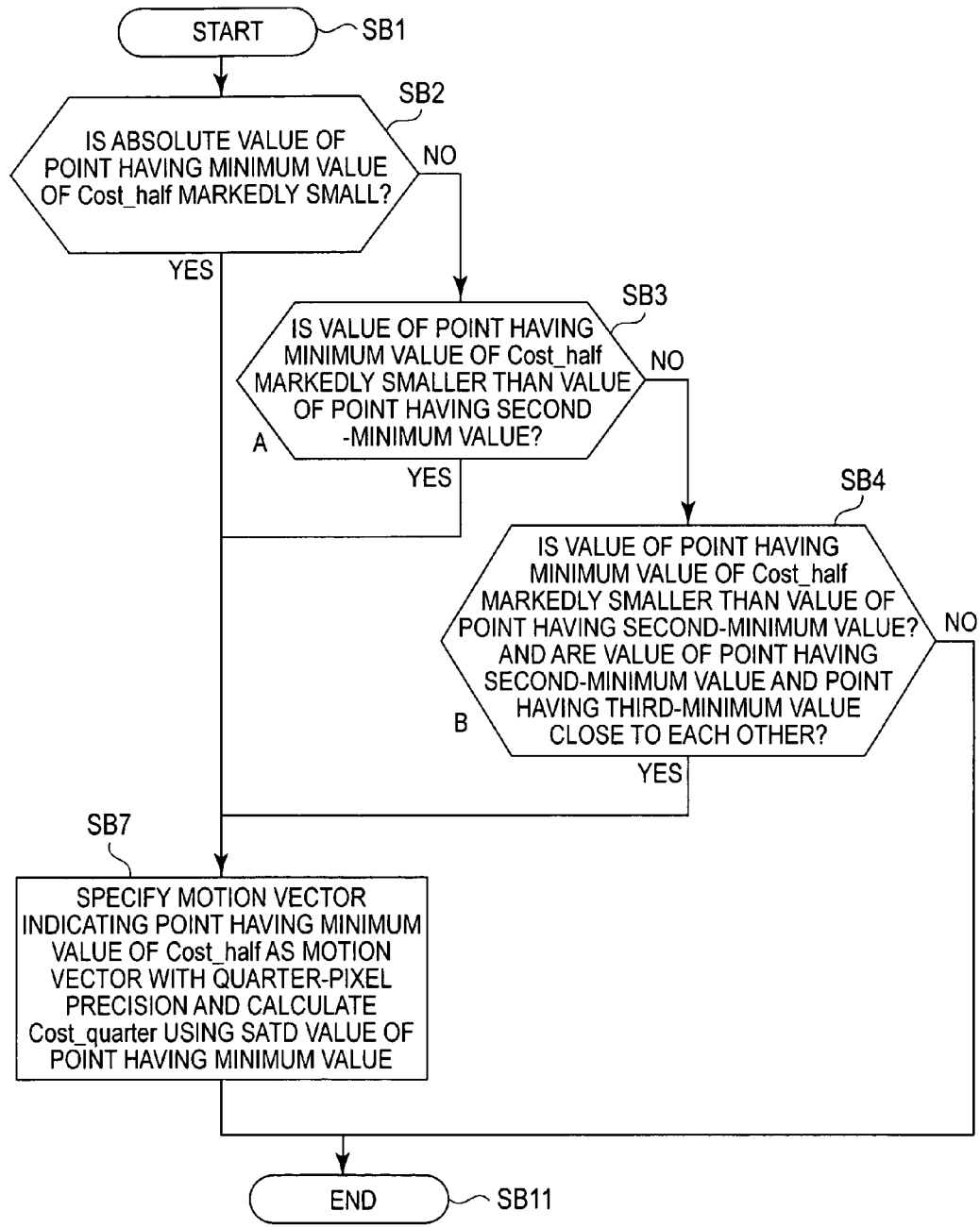
FIG. 9 is a flowchart specifically illustrating another advanced sequence of processes performed by the quarter-pixel-precision motion predicting and compensating circuit in the image encoding device according to the embodiment of the invention.

FIG. 9 shows a flowchart illustrating a sequence of processes when the combination of (A)+(B) is employed. Like reference numerals reference like processes in FIG. 3 and the repeated description is omitted. When The determination result of SB4 is NO, the sequence is ended (SB11).

Figure 10:
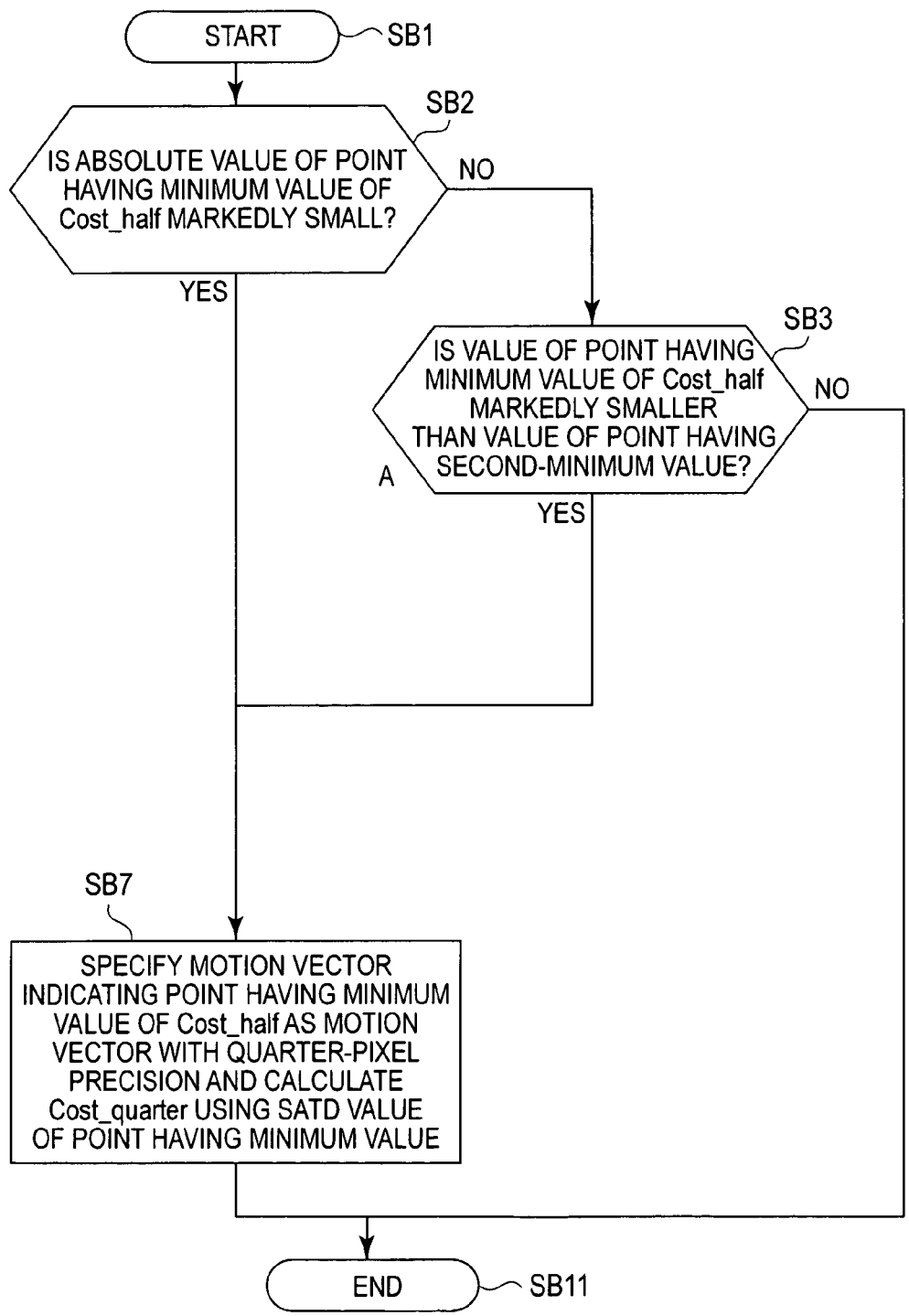
FIG. 10 is a flowchart specifically illustrating another advanced sequence of processes performed by the quarter-pixel-precision motion predicting and compensating circuit in the image encoding device according to the embodiment of the invention.

FIG. 10 shows a flowchart illustrating a sequence of processes when the combination of (A) is employed. Like reference numerals reference like processes in FIG. 3 and the repeated description is omitted. When The determination result of SB3 is NO, the sequence is ended (SB11).

As described in detail above, according to the embodiments of the invention, it is possible to greatly reduce the number of SATD operations by using the quarter-pixel-precision motion predicting and compensating unit, thereby reducing both the number of cycles and the number of hardware scales.

Since the motion vectors, the SA(T)D values, and the cost values with the quarter-pixel precision are calculated from the result of the motion compensation and detection with the half-pixel precision, it is not necessary to prepare pixels with the quarter-pixel precision for the motion detection of quarter pixels and it is possible to reduce the necessary memory capacity device.

Although the invention has been described with reference to the embodiments, the invention is not limited to the embodiments and may be modified in various forms without departing from the gist of the invention.

For example, the quarter-pixel-precision motion vector predicting circuit may include a prediction circuit calculating the motion vector with the quarter-pixel precision using an indicator indicating a noise level, a variance value and an average value of pixels, and motion vectors of neighboring blocks.

Although the cost value Cost, SAD, and SATD have been exemplified in the above-mentioned embodiments, the invention is not limited to those of the embodiments and may employ an MAE (Mean Absolute Error).

$$MAE = \frac{1}{n}\sum_{i=1}^{n} |fi - yi| = \frac{1}{n}\sum_{i=1}^{n} |ei|$$

Here, MAE is a weighted average of an absolute error $ei=fi-yi$. In the above expression, fi represents a predicted value and yi represents a real value.

The algorithms according to the embodiments of the invention can be applied to an NR (Noise Reduction) device using the motion detection such as a temporal filter. In this case, a motion vector is detected and the cost value Cost and the motion vector are calculated. Then, the strength of the temporal filter is adaptively changed depending on the cost value Cost and a filtering operation is carried out using plural frames as an input, thereby obtaining a frame from which noises are removed.

The present application contains subject matter related to that disclosed in Japanese Priority Patent Application JP 2008-184040 filed in the Japan Patent Office on Jul. 15, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A motion vector detecting device comprising:
   a motion predicting and compensating means for (i) calculating cost values of a plurality of motion vectors, wherein the motion vectors are candidates of an optimal motion vector, with a first pixel precision for each prediction mode of a plurality of prediction modes, and (ii) calculating the optimal motion vector with a second pixel precision and a cost value of the optimal motion vector with the second pixel precision on the basis of a gradient of the cost values with the first pixel precision by determining whether a comparison result of at least two cost values among the cost values with the first pixel precision is in accordance with a predetermined condition.

2. A motion vector detecting device comprising:
   a motion predicting and compensating means for (i) calculating cost values of a plurality of motion vectors, wherein the motion vectors are candidates of an optimal motion vector, with a first pixel precision for each prediction mode of a plurality of prediction modes, and (ii) calculating the optimal motion vector with a second pixel precision and a cost value of the optimal motion vector with the second pixel precision on the basis of priority of the highest N (where N=1, 2, 3, . . .) cost values with the first pixel precision by determining whether a comparison result of at least two cost values among the highest N cost values is in accordance with a predetermined condition.

3. A motion vector detecting method comprising:
   calculating cost values of a plurality of motion vectors, wherein the motion vectors are candidates of an optimal motion vector, with a first pixel precision for each prediction mode of a plurality of prediction modes; and
   calculating the optimal motion vector with a second pixel precision and a cost value of the optimal motion vector with the second pixel precision on the basis of a gradient of the cost values with the first pixel precision by determining whether a comparison result of at least two cost values among the cost values with the first pixel precision is in accordance with a predetermined condition.

4. An image encoding device comprising:
an encoding means for detecting an optimal mode to be provided to an encoding process from a plurality of first prediction modes and a plurality of second prediction modes for every predetermined block by comparison of cost values of a cost function indicating an encoding efficiency and encoding image data in the optimal mode; and
a motion predicting and compensating means for calculating (i) the cost values of a plurality of motion vectors, wherein the motion vectors are candidates of an optimal motion vector, with a first pixel precision for each first prediction mode of the plurality of first prediction modes, and (ii) calculating the optimal motion vector with a second pixel precision and a cost value of the optimal motion vector with the second pixel precision on the basis of a gradient of the cost values with the first pixel precision by determining whether a comparison result of at least two cost values among the cost values with the first pixel precision is in accordance with a predetermined condition.

5. The image encoding device according to claim 4, wherein the first prediction modes are inter prediction modes, the second prediction modes are intra prediction modes, the first pixel precision is a half-pixel precision, and the second pixel precision is a quarter-pixel precision.

6. The image encoding device according to claim 4, wherein the second pixel precision is finer than the first pixel precision.

7. The image encoding device according to claim 4, wherein the motion predicting and compensating means calculates the cost values of a plurality of motion vectors, which is candidates of an optimal motion vector, with the first pixel precision every first prediction mode and calculates the optimal motion vector with the second pixel precision and a cost value of the optimal motion vector with the second pixel precision on the basis of priority of the highest N (where N=1, 2, 3, . . .) cost values with the first pixel precision, in which the cost values with the first pixel precision are prioritized.

8. The image encoding device according to claim 4, wherein the motion predicting and compensating means calculates the cost values of a plurality of motion vectors, which is candidates of the optimal motion vector, with the first pixel precision every first prediction mode and calculates the optimal motion vector with the second pixel precision and a cost value of the optimal motion vector with the second pixel precision on the basis of priority of at least three cost values from the lowest cost value among the cost values with the first pixel precision.

9. The image encoding device according to claim 5, wherein the motion predicting and compensating means specifies as a motion vector to be used for motion compensation the motion vector indicating a point having a minimum SAD value which is the sum of absolute predicted differences or a minimum SATD value which is the sum of absolute values which are obtained by carrying out a Hadamard transform on the predicted differences in half pixels when the absolute value of the minimum SAD or SATD value is small, and calculates the cost value of the motion vector using the minimum SAD or SATD value with the half-pixel precision as an SAD or SATD value of the motion vector with the quarter-pixel precision.

10. The image encoding device according to claim 5, wherein the motion predicting and compensating means specifies as a motion vector to be used for motion compensation the motion vector indicating a point having a minimum SAD value which is the sum of absolute predicted differences in half pixels or a minimum SATD value which is the sum of absolute values which are obtained by carrying out a Hadamard transform on the predicted differences when the minimum SAD or SATD value is extremely smaller than a second-minimum SAD or SATD value, and calculates the cost value of the motion vector using the minimum SAD or SATD value with the half-pixel precision as an SAD or SATD value of the motion vector with the quarter-pixel precision.

11. The image encoding device according to claim 5, wherein the motion predicting and compensating means specifies as a motion vector to be used for motion compensation the motion vector indicating a point having a minimum SAD value which is the sum of absolute predicted differences in half pixels or a minimum SATD value which is the sum of absolute values which are obtained by carrying out a Hadamard transform on the predicted differences when the minimum SAD or SATD value is smaller than a second-minimum SAD or SATD value and a difference between the second-minimum SAD or SATD value and a third-minimum SAD or SATD value is small, and calculates the cost value of the motion vector using the minimum SAD or SATD value with the half-pixel precision as an SAD or SATD value of the motion vector with the quarter-pixel precision.

12. The image encoding device according to claim 5, wherein the motion predicting and compensating means specifies as a motion vector to be used for motion compensation the motion vector indicating a middle point between a point having a minimum SAD value which is the sum of absolute predicted differences in half pixels or a minimum SATD value which is the sum of absolute values which are obtained by carrying out a Hadamard transform on the predicted differences and a point having a second-minimum SAD or SATD value when a difference between the minimum SAD or SATD value and the second-minimum SAD or SATD value is small and a difference between the second-minimum SAD or SATD value and a third-minimum SAD or SATD value is greater, calculates an SAD or SATD value of the motion vector to be used for motion compensation from the relationship of the SAD or SATD values of the three points, and calculates the cost value of the motion vector with the quarter-pixel precision.

13. The image encoding device according to claim 5, wherein the motion predicting and compensating means specifies as a motion vector to be used for motion compensation the motion vector indicating a point with the quarter-pixel precision located in an extension line from a point having a second-minimum SAD or SATD value to a point having a minimum SAD value which is the sum of absolute predicted differences in half pixels or a minimum SATD value which is the sum of absolute values which are obtained by carrying out a Hadamard transform on the predicted differences when a difference between the minimum SAD or SATD value and the second-minimum SAD or SATD value is small, a difference between the second-minimum SAD or SATD value and a third-minimum SAD or SATD value is small, and the point having the minimum SAD or SATD value, the point having the second-minimum SAD or SATD value, and the point having the third-minimum SAD or SATD value are arranged in this order in a line, calculates an SAD or SATD value of the motion vector to be used for motion compensation from the relationship of the SAD or SATD values of the three points, and calculates the cost value of the motion vector with the quarter-pixel precision.

14. The image encoding device according to claim 5, wherein the motion predicting and compensating means specifies as a motion vector to be used for motion compensation the motion vector indicating a point with the quarter-pixel precision located in the middle way of a point having a minimum SAD value which is the sum of absolute predicted differences in half pixels or a minimum SATD value which is the sum of absolute values which are obtained by carrying out a Hadamard transform on the predicted differences, a point having a second-minimum SAD or SATD value, and a point having a third-minimum SAS or SATD value when a difference between the minimum SAD or SATD value and the second-minimum SAD or SATD value is small, a difference between the second-minimum SAD or SATD value and a third-minimum SAD or SATD value is small, and the point having the minimum SAD or SATD value, the point having the second-minimum SAD or SATD value, and the point having the third-minimum SAD or SATD value are not arranged in a line, calculates an SAD or SATD value of the motion vector to be used for motion compensation from the relationship of the SAD or SATD values of the three points, and calculates the cost value of the motion vector with the quarter-pixel precision.

15. The image encoding device according to claim 5, wherein the motion predicting and compensating means calculates a motion vector with the quarter-pixel precision and an SAD value, which is the sum of absolute predicted differences, or an SATD value, which is the sum of absolute values which are obtained by carrying out a Hadamard transform on the predicted differences, of a motion vector with the quarter-pixel precision from the cost values with the half-pixel precision, by using a combination of at least one of:

a first prediction of specifying as the motion vector to be used for motion compensation the motion vector indicating a point having a minimum SAD or SATD value when the absolute value of the minimum SAD or SATD value of the half pixels is small, and calculating the cost value of the motion vector using the minimum SAD or SATD value with the half-pixel precision as an SAD or SATD value of the motion vector with the quarter-pixel precision;

a second prediction of specifying as the motion vector to be used for motion compensation the motion vector indicating a point having a minimum SAD or SATD value when the minimum SAD or SATD value is extremely smaller than a second-minimum SAD or SATD value, and calculating the cost value of the motion vector using the minimum SAD or SATD value with the half-pixel precision as an SAD or SATD value of the motion vector with the quarter-pixel precision;

a third prediction of specifying as the motion vector to be used for motion compensation the motion vector indicating a point having a minimum SAD or SATD value when the minimum SAD or SATD value is smaller than a second-minimum SAD or SATD value and a difference between the second-minimum SAD or SATD value and a third-minimum SAD or SATD value is small, and calculating the cost value of the motion vector using the minimum SAD or SATD value with the half-pixel precision as an SAD or SATD value of the motion vector with the quarter-pixel precision;

a fourth prediction of specifying as the motion vector to be used for motion compensation the motion vector indicating a middle point between a point having a minimum SAD or SATD value and a point having a second-minimum SAD or SATD value when a difference between the minimum SAD or SATD value and the second-minimum SAD or SATD value is small and a difference between the second-minimum SAD or SATD value and a third-minimum SAD or SATD value is greater, calculating an SAD or SATD value of the motion vector to be used for motion compensation from the relationship of the SAD or SATD values of the three points, and calculating the cost value of the motion vector with the quarter-pixel precision;

a fifth prediction of specifying as the motion vector to be used for motion compensation the motion vector indicating a point with the quarter-pixel precision located in an extension line from a point having a second-minimum SAD or SATD value to a point having a minimum SAD or SATD value when a difference between the minimum SAD or SATD value and the second-minimum SAD or SATD value is small, a difference between the second-minimum SAD or SATD value and a third-minimum SAD or SATD value is small, and the point having the minimum SAD or SATD value, the point having the second-minimum SAD or SATD value, and the point having the third-minimum SAD or SATD value are arranged in this order in a line, calculating an SAD or SATD value of the motion vector to be used for motion compensation from the relationship of the SAD or SATD values of the three points, and calculating the cost value of the motion vector with the quarter-pixel precision; and a sixth prediction of specifying as the motion vector to be used for motion compensation the motion vector indicating a point with the quarter-pixel precision located in the middle way of a point having a minimum SAD or SATD value, a point having a second-minimum SAD or SATD value, and a point having a third-minimum SAS or SATD value when a difference between the minimum SAD or SATD value and the second-minimum SAD or SATD value is small, a difference between the second-minimum SAD or SATD value and a third-minimum SAD or SATD value is small, and the point having the minimum SAD or SATD value, the point having the second-minimum SAD or SATD value, and the point having the third-minimum SAD or SATD value are not arranged in a line, calculates an SAD or SATD value of the motion vector to be used for motion compensation from the relationship of the SAD or SATD values of the three points, and calculates the cost value of the motion vector with the quarter-pixel precision.

16. The image encoding device according to claim 5, wherein the motion predicting and compensating means includes a prediction circuit calculating a motion vector with the quarter-pixel precision using an indicator indicating a noise level, a variance value and an average value of pixels, and motion vectors of neighboring blocks.

17. A non-transitory computer-readable medium on which is recorded a program instructing a computer to perform the steps of:

detecting an optimal mode to be provided to an encoding process from a plurality of first prediction modes and a plurality of second prediction modes for each predetermined block of a plurality of predetermined blocks by comparison of cost values of a cost function indicating an encoding efficiency;

calculating the cost values of a plurality of motion vectors, wherein the motion vectors are candidates of an optimal motion vector, with a first pixel precision for each first prediction mode of the plurality of first prediction modes to encode image data in the optimal mode; and calculating the optimal motion vector with a second pixel precision and a cost value of the optimal motion vector with the second pixel precision on the basis of a gradient of the cost values with the first pixel precision by determining whether a comparison result of at least two cost values among the cost values with the first pixel precision is in accordance with a predetermined condition.

18. A motion vector detecting device comprising:

a motion predicting and compensating unit including a processor configured (i) to calculate cost values of a plurality of motion vectors, wherein the motion vectors are candidates of an optimal motion vector, with a first pixel precision for each prediction mode of a plurality of prediction modes, and (ii) to calculate the optimal motion vector with a second pixel precision and a cost value of the optimal motion vector with the second pixel precision on the basis of a gradient of the cost values with the first pixel precision by determining whether a comparison result of at least two cost values among the cost values with the first pixel precision is in accordance with a predetermined condition.

* * * * *